United States Patent
Vote et al.

(10) Patent No.: US 7,766,730 B2
(45) Date of Patent: Aug. 3, 2010

(54) CARCASS TRACKING

(75) Inventors: Derek Vote, Valley Center, KS (US);
Randy Cooper, Gypsum, KS (US)

(73) Assignee: Cargill, Incorporated, Wayzata, MN (US)

( * ) Notice: Subject to any disclaimer, the term of this patent is extended or adjusted under 35 U.S.C. 154(b) by 517 days.

(21) Appl. No.: 11/766,618

(22) Filed: Jun. 21, 2007

(65) Prior Publication Data

US 2008/0003937 A1    Jan. 3, 2008

Related U.S. Application Data (63) Continuation-in-part of application No. 10/878,634, filed on Jun. 28, 2004, now Pat. No. 7,400,256, which is a continuation-in-part of application No. 10/704,408, filed on Nov. 7, 2003, now Pat. No. 6,975,233, said application No. 10/704,408 is a continuation of application No. 10/000,965, filed on Nov. 1, 2001, now Pat. No. 6,724,309, said application No. 10/878,634 is a continuation-in-part of application No. 11/290,131, filed on Nov. 30, 2005, which is a continuation of application No. 10/704,408, filed on Nov. 7, 2003.

(60) Provisional application No. 60/483,142, filed on Jun. 27, 2003, provisional application No. 60/245,891, filed on Nov. 3, 2000.

(51) Int. Cl.
A22C 25/04 (2006.01)

(52) U.S. Cl. .................................................. 452/184

(58) Field of Classification Search ................ 452/157, 452/158, 173; 198/465.4, 680
See application file for complete search history.

(56) References Cited

U.S. PATENT DOCUMENTS

| | | | |
|---|---|---|---|
| 1,395,333 A | 11/1921 | Bayerdorffer | |
| 1,441,433 A | 1/1923 | Kisner | |
| 1,956,974 A | 5/1934 | Bayerdorffer | |
| 2,084,668 A | 6/1937 | Brooks | |
| 2,163,016 A | 6/1939 | Barker | |
| 2,341,608 A | 2/1944 | Gey | |
| 3,511,370 A * | 5/1970 | Taylor | 209/592 |

(Continued)

FOREIGN PATENT DOCUMENTS

WO     WO 93/22907     11/1993

(Continued)

OTHER PUBLICATIONS

International Search Report of PCT/US01/47284 mailed Nov. 5, 2002, (1 pg).

*Primary Examiner*—Thomas Price (57) ABSTRACT

A system and method for storing, selecting and sorting animal carcasses for fabrication. A storage area has at least one storage rail upon which carcasses may be stored. A feed rail leads to the storage area. Carcasses are selected from the storage area based on a first set of criteria and are transferred to an exit rail. The selected carcasses can be sorted based on a second set of criteria using a sorting rail connected to the exit rail. Carcasses are selected and sorted based on carcass information stored in a database based on identification codes associated with each target. A processor compares the carcass information with the desired criteria and identifies carcasses meeting the criteria using one or more readers positioned near the storage rail or exit rail.

18 Claims, 10 Drawing Sheets

U.S. PATENT DOCUMENTS

| | | | |
|---|---|---|---|
| 3,803,801 A | 4/1974 | Barth | |
| 3,952,438 A | 4/1976 | Propst et al. | |
| 4,155,886 A | 5/1979 | DeGoler | |
| 4,214,490 A | 7/1980 | Chizek | |
| 4,228,685 A | 10/1980 | Wallace | |
| 4,280,813 A | 7/1981 | DeGoler | |
| 4,313,271 A | 2/1982 | Bauer | |
| 4,499,680 A | 2/1985 | Coburn | |
| 4,512,096 A | 4/1985 | Heidecker | |
| 4,597,495 A | 7/1986 | Knosby | |
| 4,706,073 A | 11/1987 | Via Masot | |
| 4,838,036 A * | 6/1989 | Norrie | 62/63 |
| 4,865,044 A | 9/1989 | Wallace et al. | |
| 4,909,250 A | 3/1990 | Smith | |
| 4,914,843 A | 4/1990 | DeWoskin | |
| 5,324,940 A | 6/1994 | Ekstrom | |
| 5,469,170 A | 11/1995 | Mariani | |
| 5,478,990 A | 12/1995 | Montanari et al. | |
| 5,498,202 A | 3/1996 | Vande Berg | |
| 5,781,112 A | 7/1998 | Shymko et al. | |
| 5,869,341 A | 2/1999 | Woodaman | |
| 5,964,656 A | 10/1999 | Lawler, Jr. | |
| 5,973,600 A | 10/1999 | Mosher, Jr. | |
| 5,980,377 A * | 11/1999 | Zwanikken et al. | 452/184 |
| 6,196,912 B1 * | 3/2001 | Lawler et al. | 452/173 |
| 6,231,435 B1 | 5/2001 | Pilger | |
| 6,236,319 B1 | 5/2001 | Pitzer et al. | |
| 6,452,497 B1 | 9/2002 | Finlayson | |
| 6,545,604 B1 | 4/2003 | Dando et al. | |
| 6,724,309 B2 | 4/2004 | Grose et al. | |
| 6,742,309 B2 * | 6/2004 | Stewart et al. | 52/79.5 |
| 6,796,892 B2 * | 9/2004 | Allen et al. | 452/106 |
| 6,859,672 B2 * | 2/2005 | Roberts et al. | 700/89 |
| 6,975,233 B2 * | 12/2005 | Grose et al. | 340/573.1 |

FOREIGN PATENT DOCUMENTS

| | | |
|---|---|---|
| WO | WO 96/39534 | 12/1996 |
| WO | WO 00/13515 | 3/2000 |
| WO | WO 02/47485 | 6/2002 |

* cited by examiner

CARCASS TRACKING

CROSS-REFERENCE TO RELATED APPLICATIONS

This application is a continuation-in-part of U.S. application Ser. No. 10/878,634 filed on Jun. 28, 2004, now U.S. Pat. No. 7,400,256 which is a continuation-in-part of U.S. application Ser. No. 10/704,408, filed on Nov. 7, 2003, now U.S. Pat. No. 6,975,233 and which claims the benefit of U.S. Provisional Application No. 60/483,142, filed on Jun. 27, 2003. U.S. application Ser. No. 10/704,408 is a continuation of U.S. application Ser. No. 10/000,965 filed on Nov. 1, 2001, now U.S. Pat. No. 6,724,309 which claims the benefit of U.S. Provisional Application No. 60/245,891 filed on Nov. 3, 2000. U.S. application Ser. No. 10/878,634 is a continuation-in-part of U.S. application Ser. No. 11/290,131, filed on Nov. 30, 2005, which is a continuation of U.S. application Ser. No. 10/704,408, filed on Nov. 7, 2003. Each of these applications is incorporated by reference in its entirety.

FIELD OF THE INVENTION

The present invention relates to carcass tracking. More particularly, the present invention relates to a system and method for storing and selecting animal carcasses and carcass portions in a cooler for fabrication.

BACKGROUND OF THE INVENTION

During commercial meat production in an animal processing facility, a carcass is typically subjected to a number of different procedures. An animal is first stunned and bled and the hide is removed from the resulting carcass. Throughout this specification, the term "carcass" will be used to refer to the animal body or portion of an animal body after the animal is stunned and bled. Electrical stimulation may be used to facilitate bleeding. The carcass is then prewashed and may be subjected to an electrical stimulation process. The full animal carcass is typically split into sides (i.e., two approximately equal halves) depending on its species, size, and the intended purpose for the carcass. The carcass is subjected to steam pasteurization, typically after being split. The carcass is then inspected, weighed and washed. These processes typically take place in an area of the animal processing facility called the kill floor 2 (see FIG. 1). After these processes have taken place, the carcass is sent to a cooler 4 to be chilled, sorted, and stored until being sent to the fabrication area 6 for further processing. The carcass may be subjected to additional electrical stimulation before being sent to the cooler.

Figure 2:
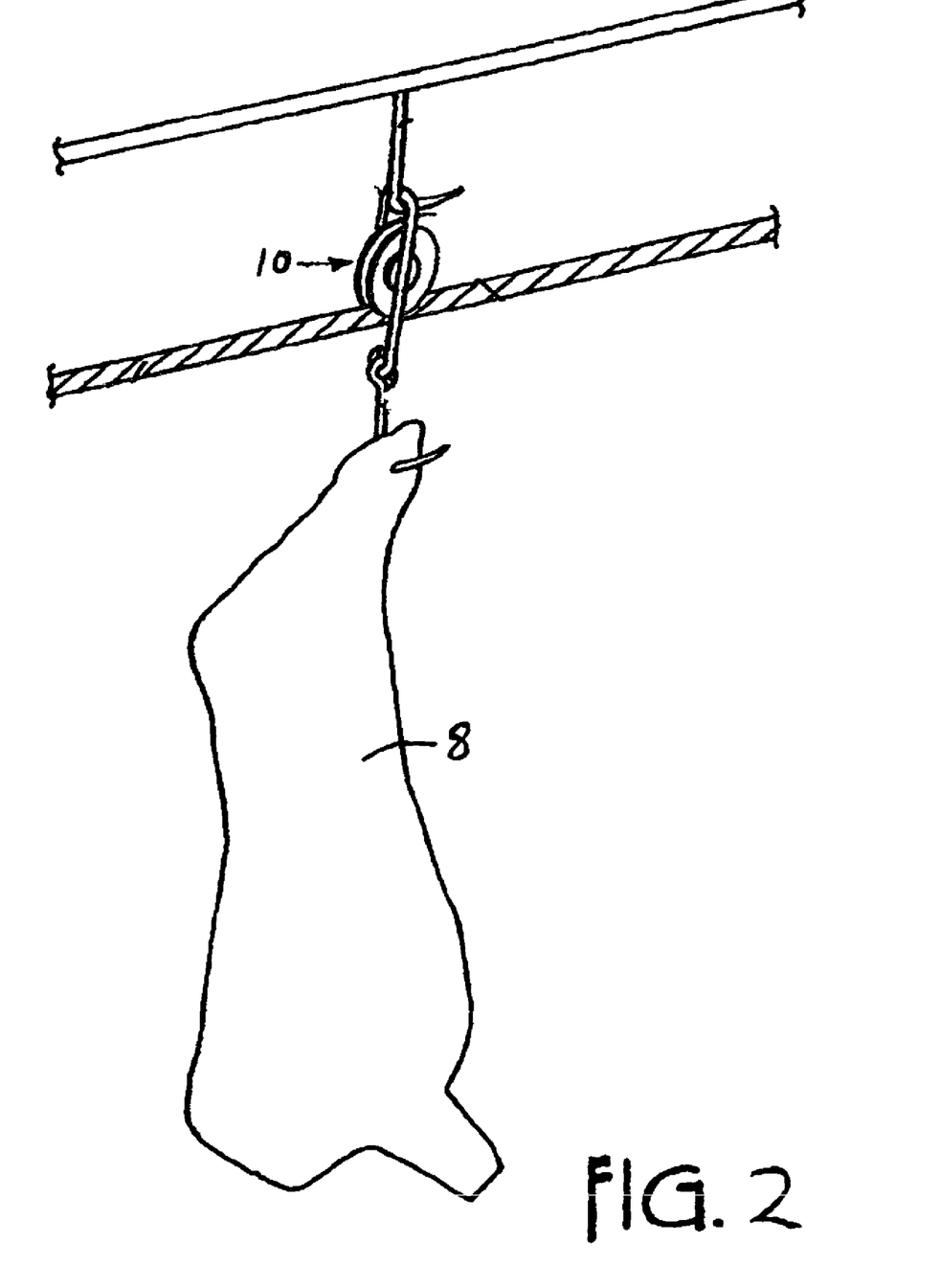
FIG. 2 is a side view of a carcass suspended from a trolley that is moving along a rail routed through an animal processing facility according to the prior art.

As shown in FIG. 2, during the processing of a carcass 8, the carcass is attached to a trolley 10, gambrel or shackle (hereinafter referred to as a "trolley") at an early point along the meat processing line. Typically, the rail 16 runs from the kill floor 2 through the cooler 4 to the fabrication area 6. The carcass 8, which is attached to the trolley 10, may thus be moved along the rail 16 to different areas within the animal processing facility.

Figure 1:
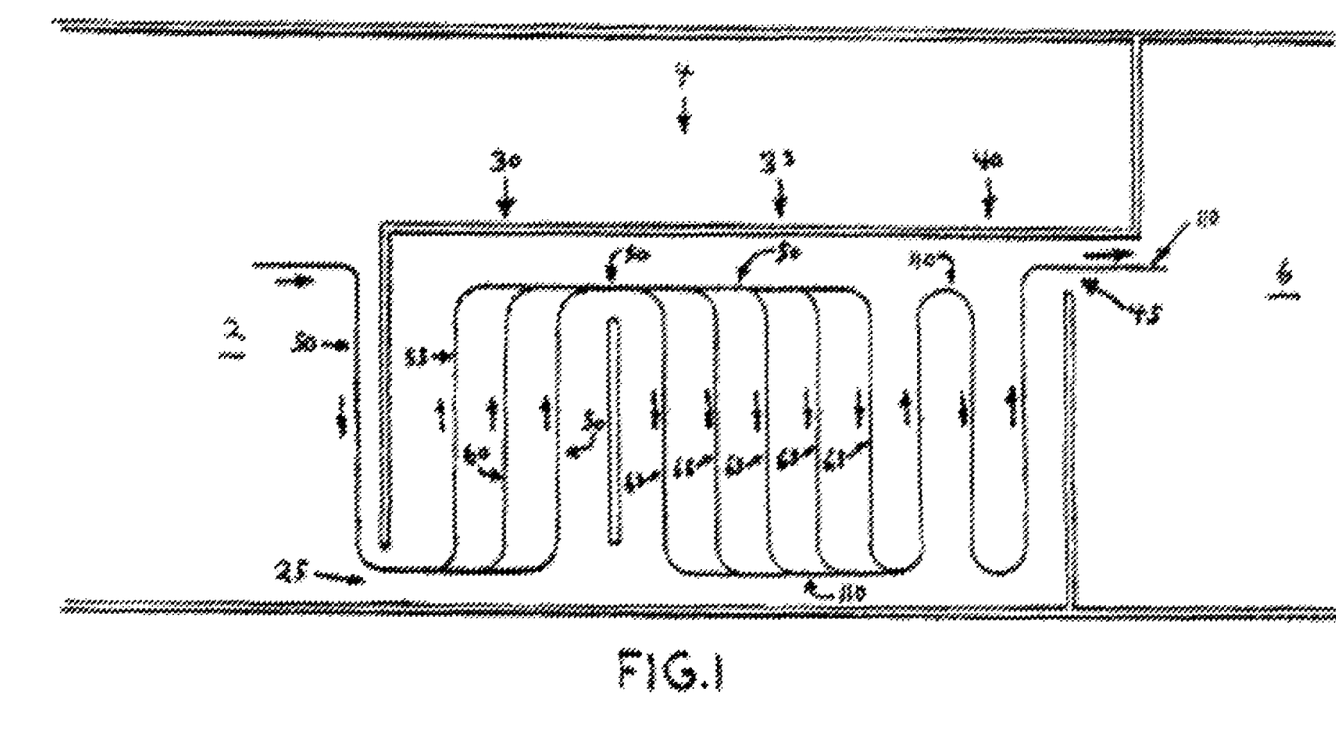
FIG. 1 is a schematic plan view of a carcass conveying and sorting system within a cooler, the system employing parallel storage rails according to the prior art.

As shown in FIG. 1, the cooler 4 typically includes an entry 25, a regrade/test area 30, a storage area 35, a staging area 40, and an exit 45. Carcasses travel on a feed rail 50 from the kill floor 2 through the entry 25 and into the regrade/test area 30 of the cooler 4. In the regrade/test area 30, the feed rail 50 branches into parallel rails, a rail 55 for testing for the presence of antimicrobials such as *E-coli*, another rail 60 serving as a regrade rail, and the third rail serving as a continuation of the feed rail 50. The *E-coli* test rail 55 and the regrade rail 60 rejoin the feed rail 50 before leaving the regrade/test area 30. Multiple rails have been used for these purposes.

Carcasses exit the regrade/test area 30 and enter the storage area 35 via the feed rail 50. The feed rail 50 branches off into numerous parallel storage rails 65 once the feed rail 50 reaches the storage area 35 (see FIG. 1). The parallel storage rails 65 allow the carcasses to be sorted according to various criteria such as, for example, weight, rib eye area, projected meat yield, grade, marbling score, and projected subprimal weight. For example, all 800 pound carcasses could be sorted onto the first storage rail 65 while all 900 and 1000 pound carcasses could be sorted onto the second and third storage rails 65, respectively. Carcasses leave their respective storage rails 65 in a first in, first out (FIFO) basis.

While parallel storage rails 65 allow sorting of carcasses according to various criteria, they present two drawbacks. First, using parallel storage rails may 65 result in an inflexible system because each carcass on the storage rail 65 may only exit the storage rail 65 according to a FIFO basis. Thus, selection for processing of specific individual carcasses off of a storage rail 65 is difficult.

Second, use of parallel storage rails 65 may result in inefficient utilization of the storage area 35. For example, the storage area 35 may have five storage rails 65, each storage rail 65 being dedicated to one of classes A through E (these classes are used for example only and are not intended to represent any true class) and each storage rail 65 having a storage capacity of 100 carcasses. During a typical processing period, 20 class A carcasses may be waiting to enter the storage area 35. However, the storage area 35 may already contain 100 class A carcasses, 55 class B carcasses, 20 class C carcasses, 85 class D carcasses and 40 class E carcasses. Thus, although the storage space of the storage area 35 is only 60 percent utilized, the 20 class A carcasses cannot enter the storage area 35 because the class A carcass storage rail 65 is already at capacity.

BRIEF SUMMARY OF THE INVENTION

One embodiment of the present invention provides a system for conveying carcasses through a meat processing facility. The system includes a feed rail that conveys carcasses to a carcass cooler and an exit rail that conveys carcasses from the carcass cooler to a fabrication area. The carcass cooler includes a storage area having at least one storage rail for receiving and storing carcasses. In certain embodiments, the carcass cooler also includes a staging area having at least one staging rail for receiving carcasses from the storage area.

The exit rail is associated with a sorting rail via an entrance path and an exit path. The sorting rail allows carcasses selected from the carcass cooler to be further sorted, refined, reordered and/or removed (collectively referred to herein and "sorted") prior to fabrication. In one embodiment, the sorting rail is located outside of the cooler to maximize cooler efficiency. Examples of suitable sorting rail configurations include one or more continuous loops, bypass rails or parallel rails.

Another embodiment of the present invention includes a method for processing carcasses using embodiments of the systems described herein in, in which carcasses are assigned unique identification codes. Information relating to the carcasses obtained during processing is stored in a database by the identifications codes. After initial processing, the carcasses are conveyed to a storage rail located in the carcass cooler. Stored carcasses are selected for fabrication based on a first set of criteria, and are conveyed from the storage area to the fabrication area along an exit rail. Prior to fabrication, the selected carcasses are further sorted according to a second set of criteria. Exemplary criteria for selecting and sorting the carcasses include weight, rib eye characteristics, predicted meat yield, carcasses grade, marbling score, predicted tenderness and/or predicted sub-primal weight.

A further embodiment of the present invention includes means for identifying a plurality of carcasses, means for storing carcass information using the identifying means, means for selecting stored carcass and means for sorting the selected carcasses prior to fabrication. The system may also include one or more rails for conveying the carcasses for storage, selection and sorting. Particular embodiments for accomplishing the identifying, selecting and sorting means are discussed below.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

DETAILED DESCRIPTION

Figure 3:
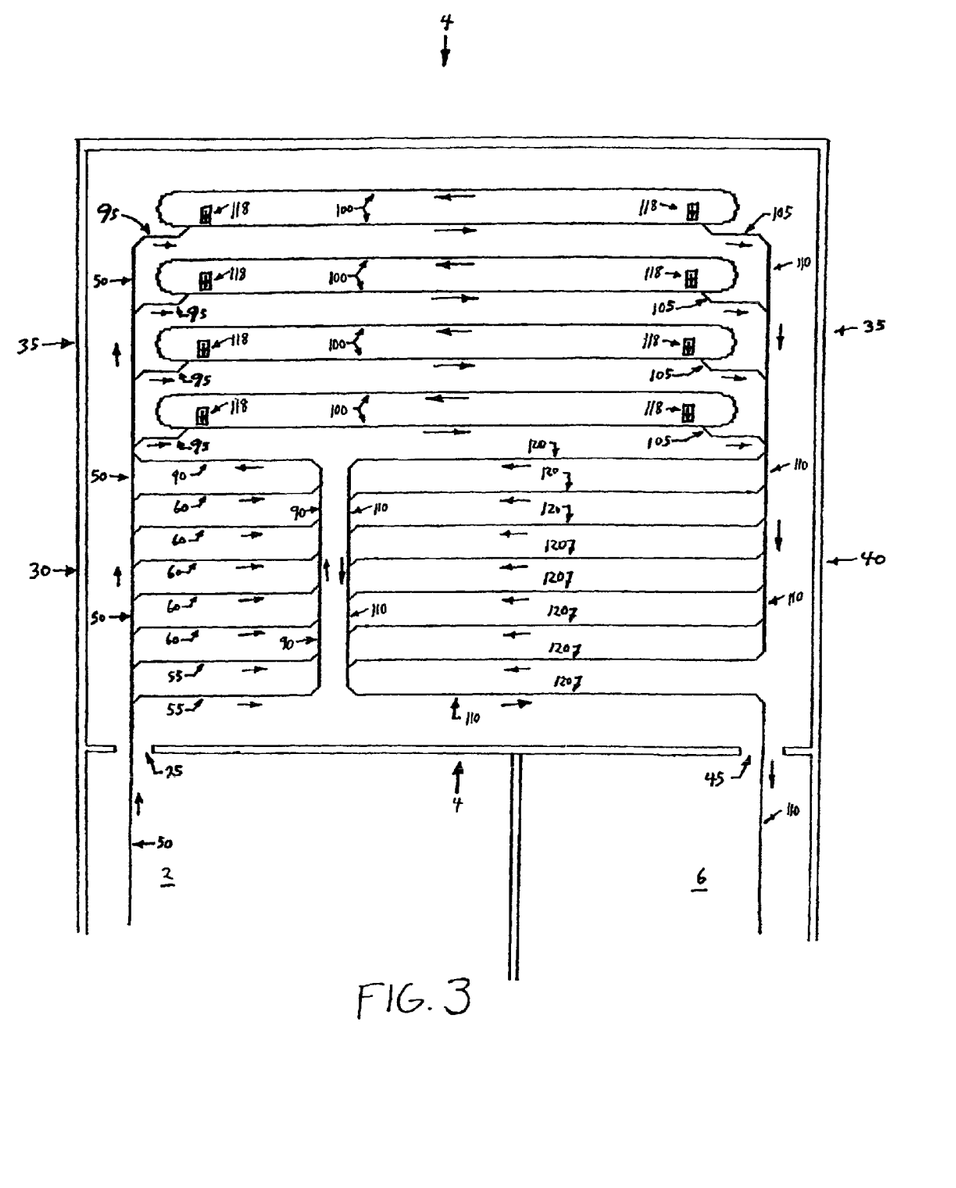
FIG. 3 is a schematic plan view of a carcass conveying and selecting system within a cooler, the system employing storage loops in accordance with an exemplary embodiment of the present invention.

FIG. 3 shows a cooler 4 according to an exemplary embodiment of the invention. The cooler 4 has an entry 25, a regrade/test area 30, a storage area 35, a staging area 40, and an exit 45. Carcasses travel on a feed rail 50 from the kill floor 2 through the entry 25 and into the regrade/test area 30 of the cooler 4. In the regrade/test area 30, parallel rails branch off of the feed rail 50 while the feed rail 50 continues on into the storage area 35. Some parallel rails branching off of the feed rail 50 serve as test rails 55 (e.g., for bacterial or *E-coli* testing) and other rails serve as regrade rails 60. The ratio of test rails to regrade rails is not critical. Further, one or more of the parallel rails may be other than a regrade rail or a test rail. The test rails 55 and the regrade rails 60 merge into a return rail 90, which in turn merges into the feed rail 50 at a point before the feed rail 50 enters the storage area 35.

In the regrade/test area 30, carcasses to be subjected for testing, e.g. for *E-coli* or other bacteria, are routed from of the feed rail 50 onto one of the test rails 55. Similarly, carcasses that are to be regraded are routed from of the feed rail 50 onto one of the regrade rails 60. Carcasses not subject to testing or regrading continue traveling on the feed rail 50 through the regrade/test area 30 to the storage area 35. Carcasses subject to testing or regrading travel to the storage area 35 via the return rail 90 and feed rail 50 after a predetermined period or fulfillment of a condition, e.g., upon completion of their testing or regrading.

The storage area 35 has at least one storage loop 100 forming a continuous loop upon which carcasses may circulate. The storage loop 100 may be thought of as a track, path or route upon which carcasses may travel. As the feed rail 50 enters the storage area 35, loop entry rails 95 branch off of the feed rail 50 and the feed rail 50 eventually terminates as a loop entry rail 95. Each loop entry rail 95 intersects a point on a storage loop 100. At another point on a storage loop 100, a removal rail 105 intersects each storage loop 100. Each removal rail 105 merges into an exit rail 110 before the exit rail 110 leaves the storage area 35 for the staging area 40.

While FIG. 3 illustrates an embodiment having four storage loops 100, other embodiments of the invention incorporate a lesser or greater number of storage loops 100. Further, the functions of the loop entry rail 95 and removal rail 105 may be combined such that each storage loop 100 only intersects a single rail. In another embodiment, the loop entry rail 95 and the removal rail 105 intersect the storage loop 100 at or near the same location on the storage loop 100. Alternately, multiple loop entry rails 96 and removal rails 105 may intersect each storage loop 100. The length of each loop entry rail 96 and removal rail 105 may vary. For example, the loop entry rails 96 and removal rails 105 may be sized to hold a single carcass or may be sized to hold multiple carcasses.

Each storage loop 100 has a rail, or similar conveying device, forming a continuous loop whereon the carcasses 8 may circulate. As a carcass travels along the feed rail 50 within the storage area 35, the carcass may be routed to the storage loop 100 having the greatest available capacity. Thus, the carcass may be routed to the first storage loop having any available capacity. Routing to a storage loop having the greatest available capacity does not require sorting onto a specific storage rail. Alternately, the storage loop 100 to which any given carcass is routed may be determined according to other criteria.

By sending carcasses the storage loop 100 having the greatest available capacity, all of the storage space within the storage area 35 may be utilized. This is much more efficient than the approximately 60 percent storage space utilization rate typically resulting from systems using parallel storage rails 65.

Figure 4:
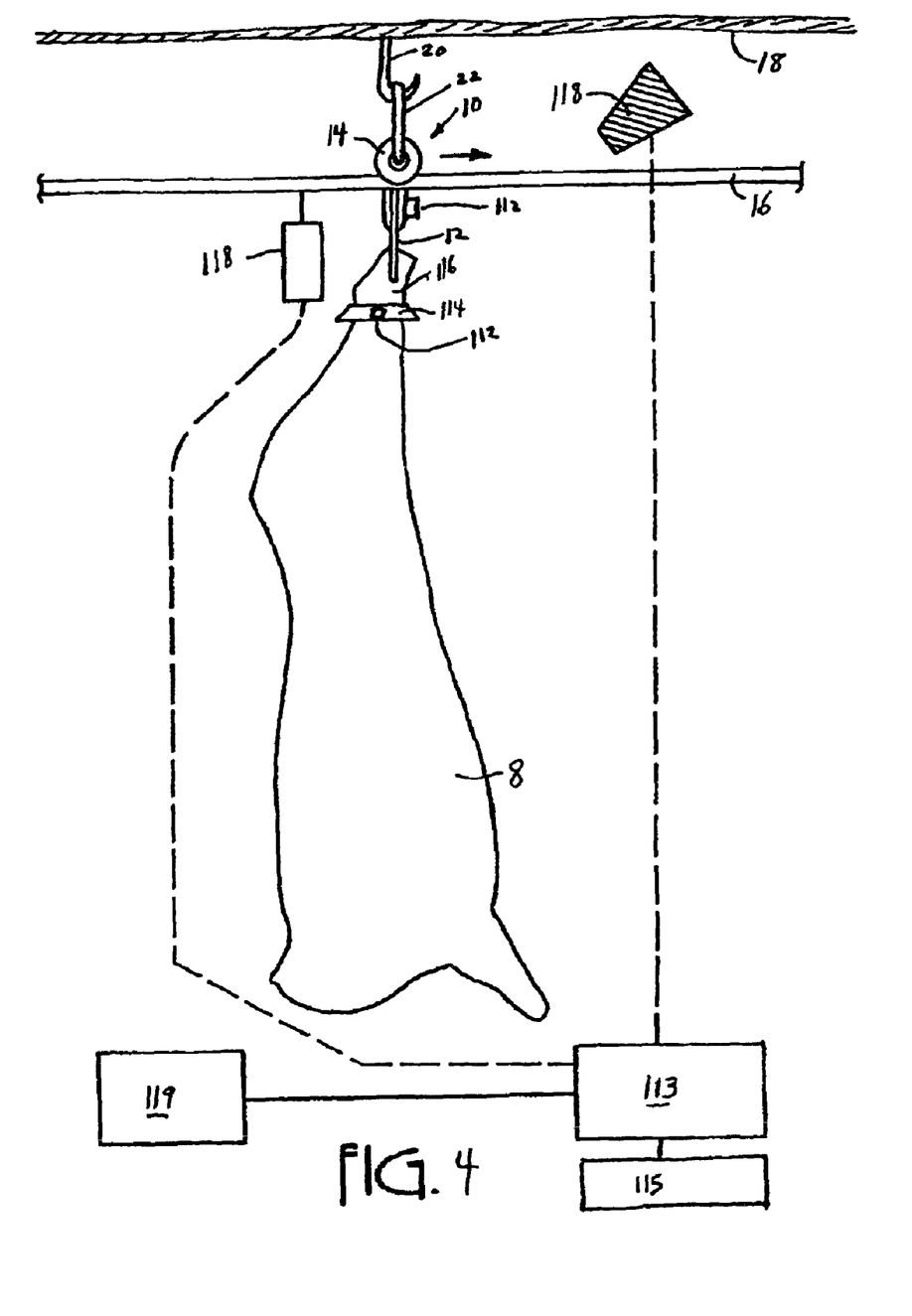
FIG. 4 depicts a carcass tracking and selection system for use with storage loops in accordance with an exemplary embodiment of the present invention.

As depicted in FIG. 4 and explained in U.S. Pat. No. 6,724,309 entitled Method And Apparatus For Tracking Carcasses, filed Nov. 1, 2001 and issued Apr. 20, 2004, from which the current application claims priority, each carcass 8, prior to leaving the kill floor 2, may be associated with a readable identification tag 112. The identification tag 112 carries an identification code. As the carcass 8 arrives at various locations within the animal processing facility, its identification tag 112 is read to obtain the identification code. At the same time, information relating to the carcass 8 may be gathered.

The information gathered may include, for example, time of slaughter, animal type, carcass weight, grade, rib eye area, projected meat yield, marbling score, and projected subprimal weight. The information and the identification code may be sent to a processor 113 and database 115 for correlation and storage.

As further shown in FIG. 4, the identification tag 112 may be located on the trolley 10 carrying or conveying the carcass 8. The trolley may be a wheel, roller, belt, slide, glide, or other suitable apparatus. The identification tag 112 may alternately be located on a band 114 placed on a limb 116 or other portion of the carcass 8. Of course, any other suitable location for the identification tag may be used. Readers 118 may be provided for reading the identification tag 112 as the carcass travels along the rail 16.

As indicated in FIG. 4, a reader 118 may be located adjacent or proximate to the rail 16, for example above, below or on the rail 16. any suitable tag and reader configuration may be used. In one embodiment, the tag 112 is a bar code and the reader 118 is a bar code reader. In another embodiment, the identification tag 112 is a radio-frequency identification ("RFID") tag and the reader 118 is a radio-frequency ("RF") reader. RFID tags can be passive or active and read-only or read-write.

In a further embodiment, the identification tag 112 and reader 118 utilize two-dimensional data matrix code technology. A data matrix code is a two-dimensional matrix barcode consisting of black and white square modules arranged in either a square or rectangular pattern. The information to be encoded can be text or raw data. Usual data size is from a few bytes up to 2 kilobytes. The length of the encoded data depends on the symbol dimension used. Error correction codes are added to increase symbol strength so that codes can be read even if partially damaged.

Data Matrix codes can be marked directly onto components such as the trolleys 10 that carry the carcasses. Identification tags with data matrix codes can be formed using various techniques including ink-jet, dot-pen marking, laser marking, electrolytic chemical etching (ECE) and resin deposition. These methods may result in a very durable tag.

In yet another embodiment, a bar code or data matrix code is imprinted directly onto the carcass using ink-jet or laser printing technology. In this embodiment, one or more bar codes or matrix codes are printed onto each carcass prior to processing, and these codes are read by readers at desired times during processing. Suitable ink jet printing systems are available from Leibinger (Norwalk, Conn.). Suitable laser printing systems are available from Keyence (Woodcliff Lake, N.J.).

As shown in FIG. 3, located next to each storage loop 100 are one or more readers 118 for reading the identification tag 112 associated with each carcass 8. A reader 118 may be located near the intersection between the storage loop 100 and the loop entry rail 95. Alternately, a reader 118 may be located near the intersection between the storage loop 100 and the removal rail 105. Further, a reader 118 may be located near both intersections. In one embodiment, one or more readers 118 are located at various locations on each storage loop 100.

After entering the staging area 40, staging rails 120 branch off of the exit rail 110. Carcasses may be temporarily stored on the staging rails 120 until called for by the fabrication area 6. The staging rails 120 merge back into the exit rail 110, which is routed out of the staging area 40, through the exit 45 of the cooler 4 and to the fabrication area 6.

Figure 5:
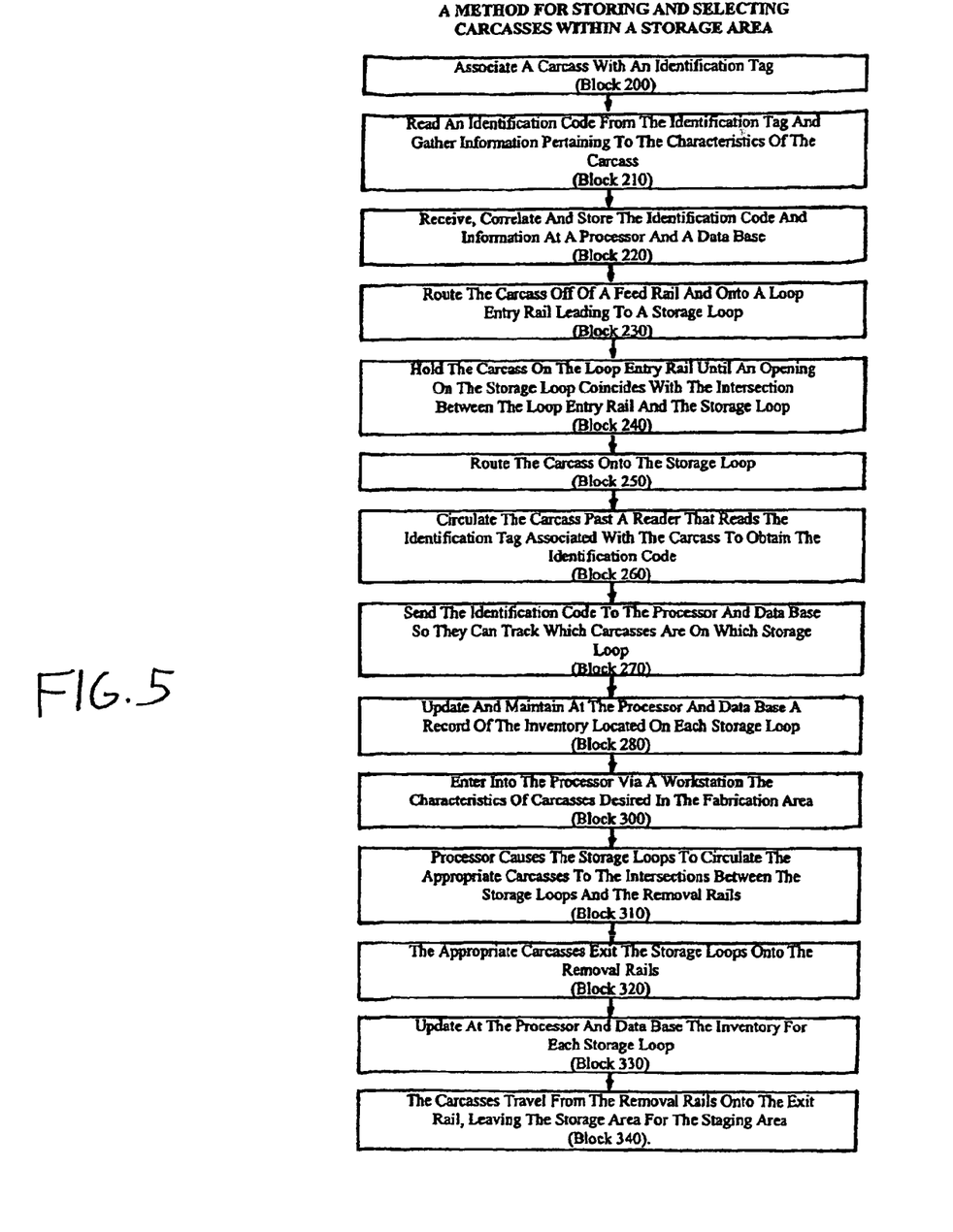
FIG. 5 is a block diagram illustrating a method of storing and selecting carcasses within a storage area having storage loops in accordance with an exemplary embodiment of the present invention.

FIG. 5 is a block diagram illustrating a method of storing and selecting carcasses 8 within a storage area 35, according to one embodiment of the invention. Each carcass 8 is associated with an identification tag 112 (Block 200). A reader 118 reads an identification code from the identification tag 112 and information pertaining to the characteristics of the carcass is gathered (Block 210). The processor 113 and database 115 receive, correlate and store the identification code and information (Block 220).

As a carcass is routed to a storage loop 100 in the storage area 35, it is routed from of the feed rail 50 and onto the loop entry rail 95 leading to the storage loop 100 (Block 230). The carcass is stored at the loop entry rail 95 until an opening on the storage loop 100 coincides with the intersection between the loop entry rail 95 and the storage loop 100 (Block 240). The carcass is routed onto the storage loop 100 (Block 250). The carcass is circulated past a reader 118 that reads the identification tag 112 associated with the carcass 8 (Block 260). The carcasses may be spaced at approximately 16" intervals on the storage loop 100. Alternately, any suitable spacing may be used. The identification code from the identification tag 112 is sent to the processor 113 and database 115 (see FIG. 4) that track which carcasses 8 are on which storage loop 100 (Block 270). The processor 113 and database 115 update and maintain a record of the inventory located on each storage loop 100 (Block 280).

In lieu of identification tags, the carcasses may be inventoried based upon visual characteristics. Thus, to inventory the carcasses on a storage loop, the loop may be cycled one time and the characteristics of the carcasses on the loop recorded.

Because the carcasses are located on a storage loop 100 and tracked by a processor 113 and database 115, an individual carcass meeting specific criteria may be located and pulled off of the storage loop 100 for the fabrication area 6 (or for other purposes such as inspection), regardless of the order in which the carcass entered the storage loop 100. Thus, the storage loops 100 allow carcasses to be selected according to a predetermined number of categories, based on the number of carcass positions available at the facility.

Referring again to FIG. 5, in one embodiment, when the fabrication area 6 requires carcasses 8 meeting specific criteria, the criteria are entered into the processor 113 via a workstation 119 (see FIG. 4) (Block 300). The processor 113 causes the storage loops 100 to circulate the appropriate carcasses to the intersections between the storage loops 100 and the removal rails 105 (see FIG. 3) (Block 310). The appropriate carcasses 8 exit the storage loops 100 onto the removal rails 105 (Block 320). The carcasses 8 travel from the removal rails 105 onto the exit rail 110, leaving the storage area 35 for the staging area 40 (Block 340). The processor 113 and database 115 update the inventory for each storage loop 100 (Block 330).

Alternate embodiments of the present invention, described with reference to FIGS. 6-10, include a sorting rail 350 connected to the exit rail 110 via an entrance path 352 and an exit path 354. The sorting rail 350 may be utilized to sort the carcasses selected from cooler just prior to fabrication based on additional fabrication criteria. The sorting rail 350 may be positioned inside the cooler 4, in the fabrication area 6 or anywhere in between. As illustrated, the exit rail 110 is connected to rails located in the staging area 40 and extends through cooler exit 45 to fabrication area 6.

Figure 6:
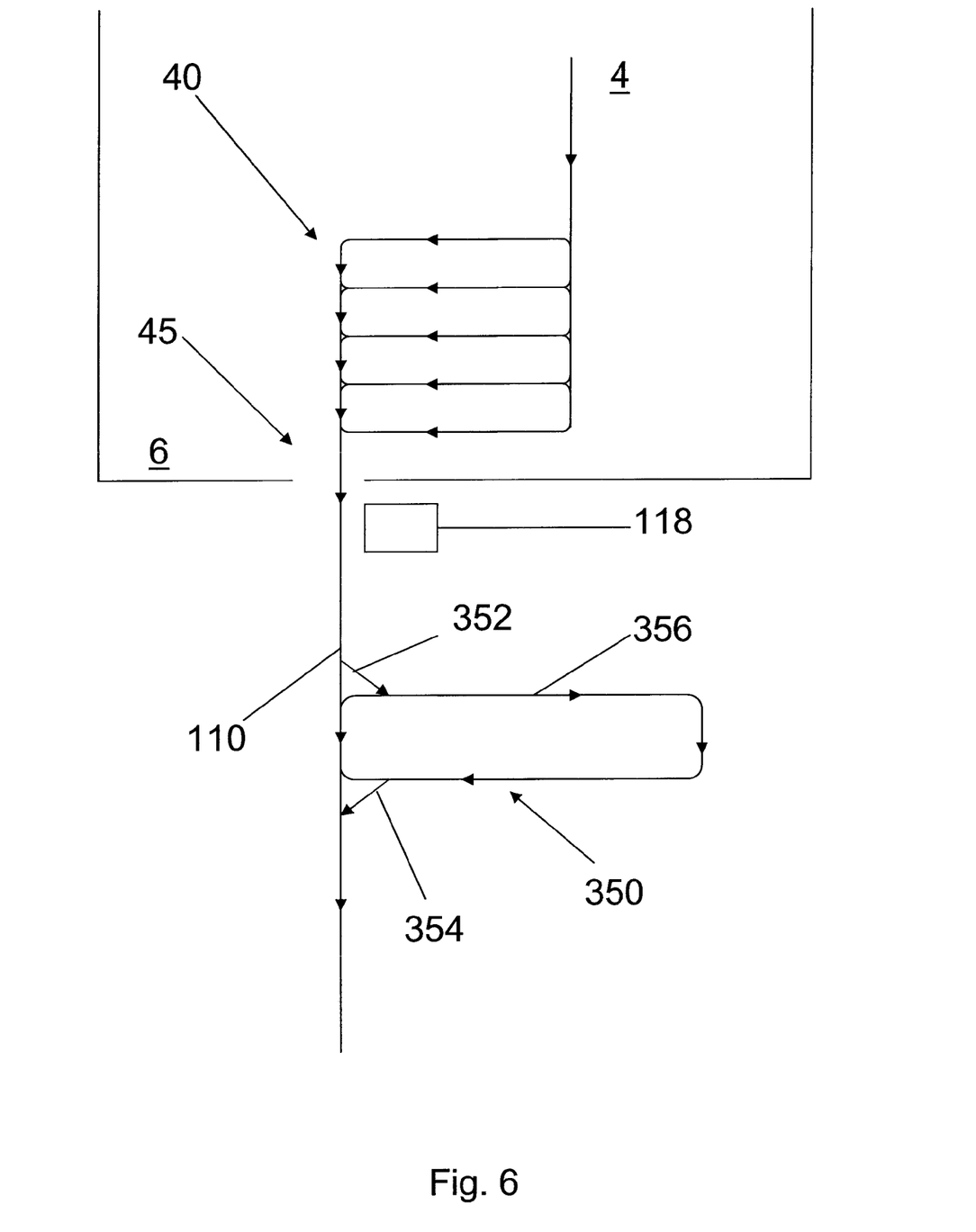
FIG. 6 illustrates a system including a sorting rail according to one embodiment of the present invention.

FIG. 6 illustrates one embodiment of the present invention, in which the sorting rail 350 is configured as a continuous loop 356 similar to the continuous loops illustrated in FIG. 4. The continuous loop 356 includes a separate entrance path 352 and exit path 354 to allow selected carcasses to be easily sorted prior to fabrication. In an alternate embodiment, the entrance path 352 and exit path 354 could constitute a single rail. In further embodiments, multiple continuous loops having a single or multiple entrance and exit paths could be utilized. Embodiments of the invention may be used for meat production of any type of animal, including all age classes of bovine, porcine, ovine, and poultry animals.

Figure 7:
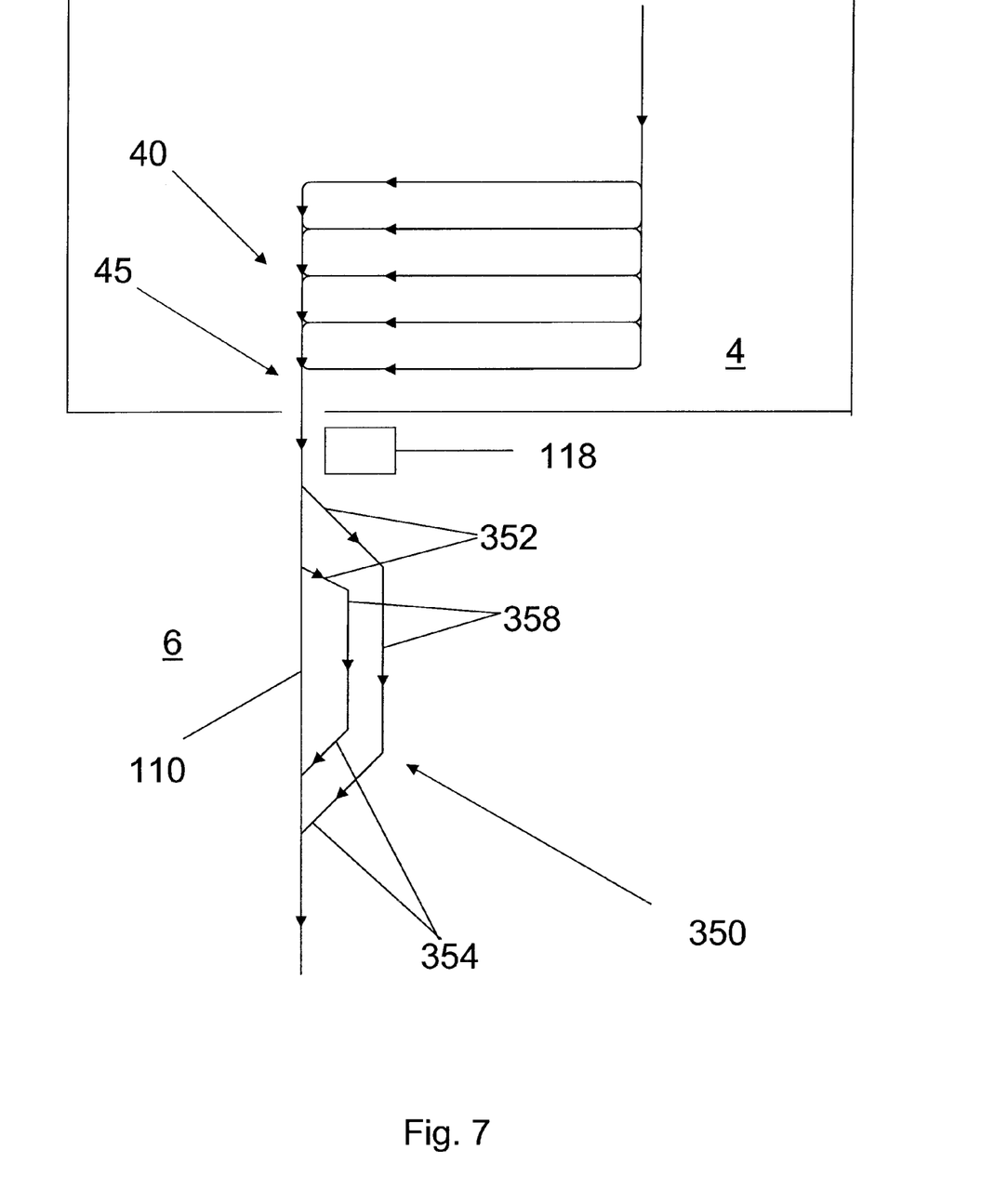
FIG. 7 illustrates a system including a sorting rail according to another embodiment of the present invention.

FIG. 7 illustrates another embodiment of the invention in which the sorting rail 350 is configured as one or more bypasses 358 such that the order of the carcasses on the exit rail 110 can be resorted prior to fabrication by allowing carcasses conveyed along the bypasses 358 to be advanced toward fabrication at a different rate than carcasses that remain on the exit rail 110. Although the embodiment shown in FIG. 7 includes two bypass rails 358, additional rails having different shapes, lengths and/or chain speeds could be utilized.

Figure 8:
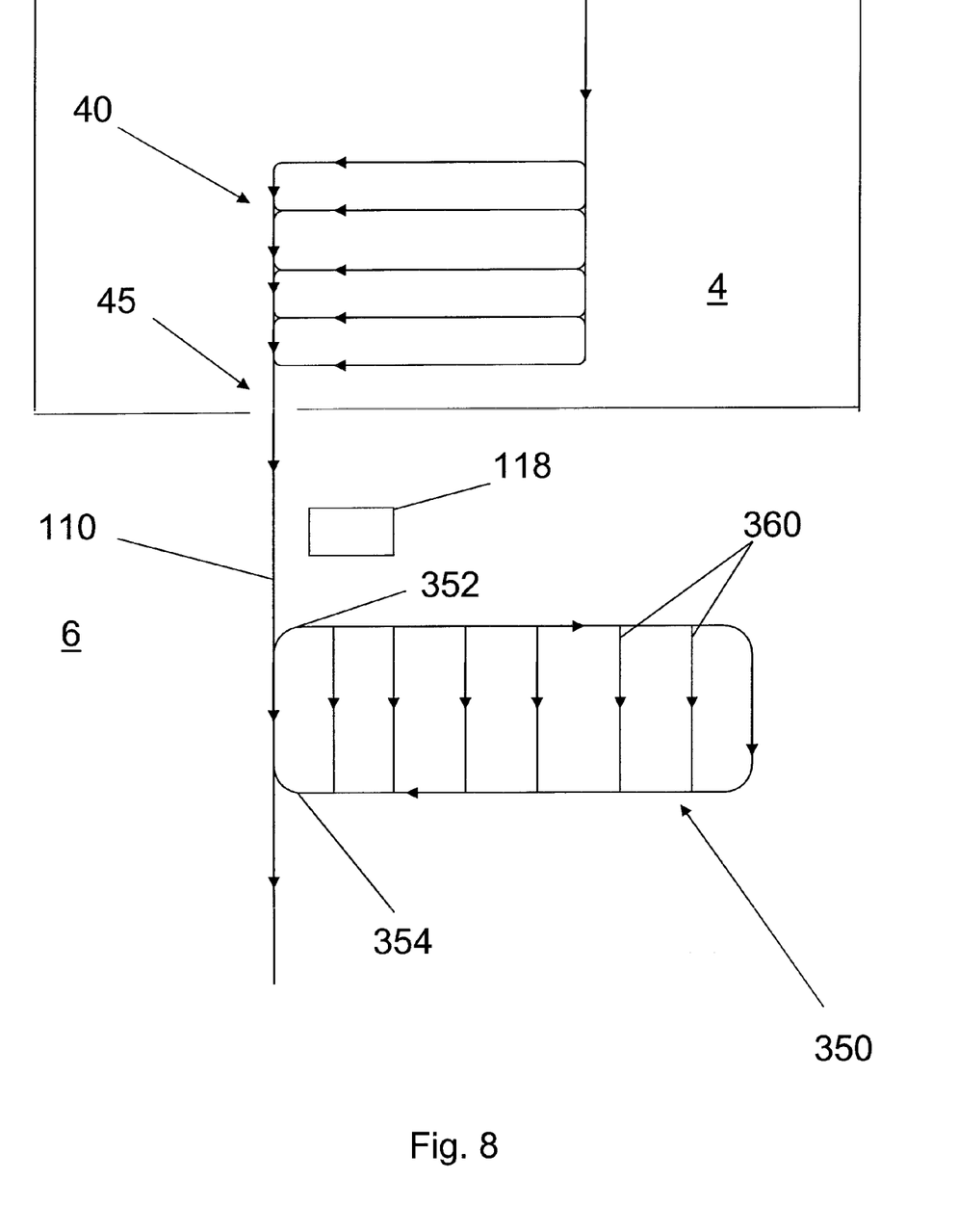
FIG. 8 illustrates a system including a sorting rail according to another embodiment of the present invention.
Figure 9:
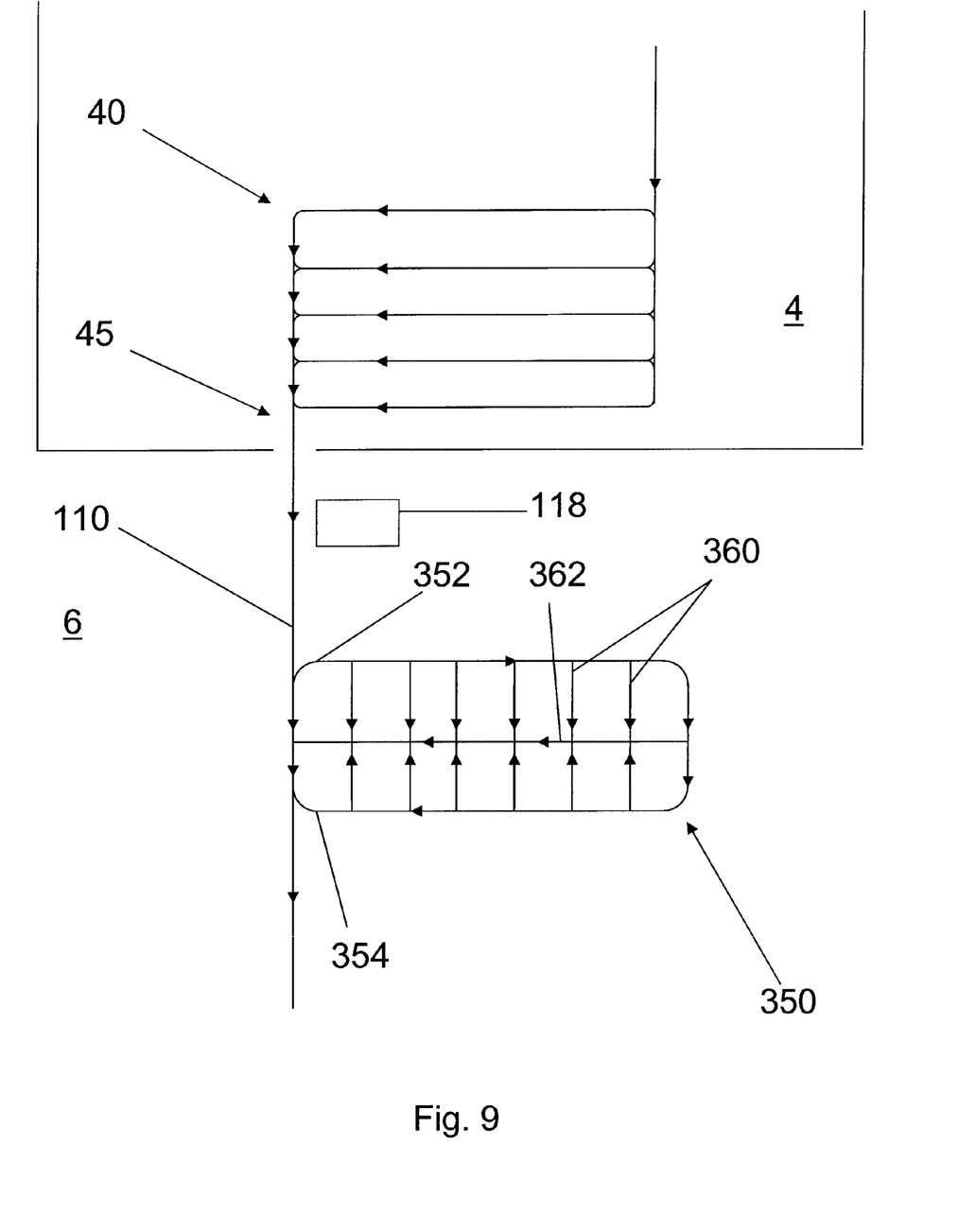
FIG. 9 illustrates a system including a sorting rail according to another embodiment of the present invention.

FIG. 8 illustrate yet another embodiment of the present invention in which the sorting rail 350 includes a plurality of parallel rails 360 each connected to an entrance path 352 and an exit path 354. The embodiment illustrated in FIG. 9 includes parallel rails 360, as well as a bisecting rail 362 to provide further options for sorting the carcasses. The sorting rail shown in FIGS. 8 and 9 could be modified with additional or fewer rails according to embodiments of the present invention.

The sorting rails 350 illustrated in FIGS. 6-9 may be use in addition to or independently from the embodiments described with reference to FIGS. 2-5. In one embodiment, the sorting rail 350 is used in conjunction with a conventional cooler arrangement such as shown in FIG. 1. In another embodiment, the sorting rail 350 is used in conjunction with the cooler arrangement shown in FIG. 3. In either case, the sorting rail 350 may be used to sort carcasses selected from just prior to fabrication based on a desired set of carcass criteria.

As described above with respect to previous embodiments, one or more readers 118 may be positioned near or along the sorting rail 350 to further track the location of selected carcasses using 112 and/or to input additional information relating to the selected carcasses. In one embodiment, a reader is placed is placed along the exit rail 110 near the entrance path 352 of the sorting rail 350. By identifying carcasses along the exit rail 110 prior to reaching the sorting rail 350, carcasses meeting desired criteria can be identified and sorted using the sorting rail 350.

Numerous criteria can be used to select and/or sort the carcasses prior to fabrication. The criteria can be established internally and/or dictated by customer order. Exemplary sorting criteria include carcass defects (e.g., bruises, missplits, slaughter damage, etc.), lean/fat color, predicted tenderness (e.g., predicted shear force), fat thickness, animal type, weight, grade, rib eye area, predicted meat yield, marbling score and/or predicted subprimal weight.

Figure 10:
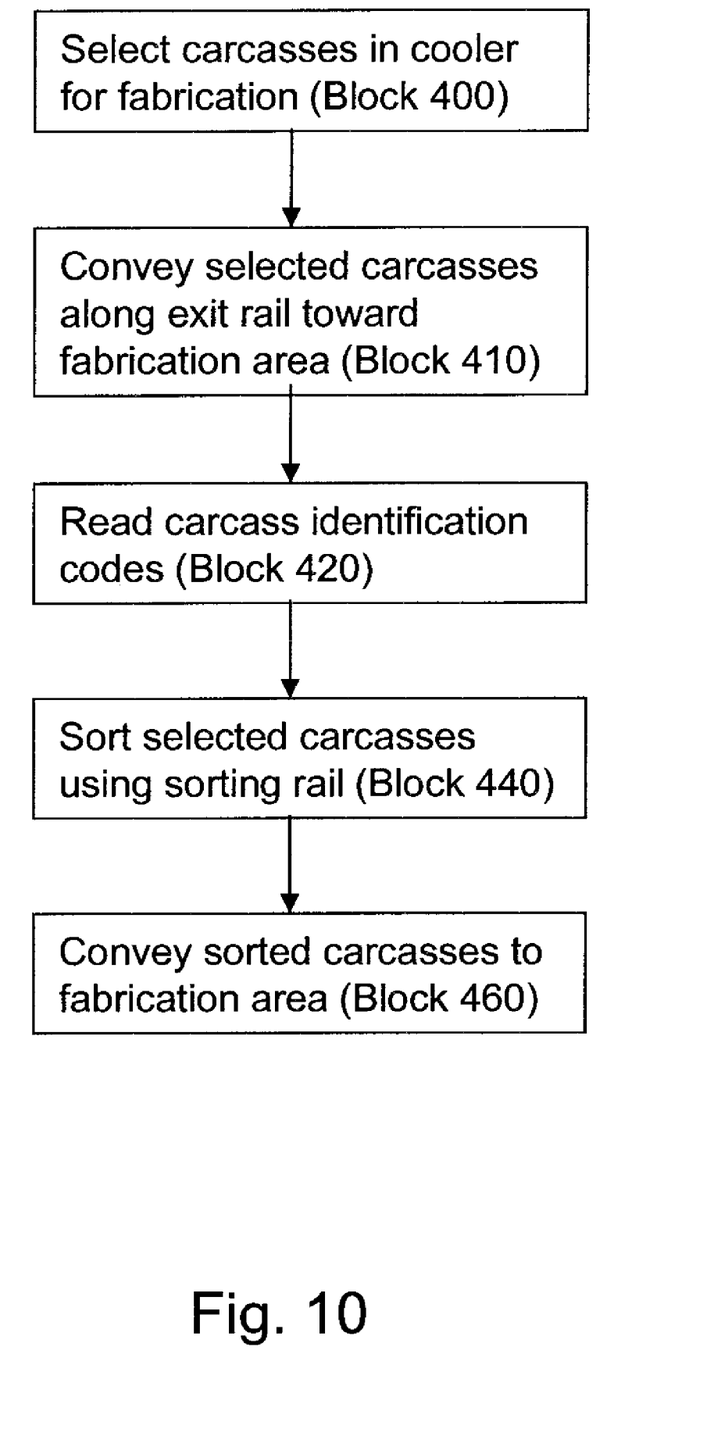
FIG. 10 is a block diagram of a method of selecting and sorting carcasses according to one embodiment of the present invention.

FIG. 10 is a block diagram illustrating a method of storing, selecting and sorting carcasses according to an embodiment of the present invention. The carcasses are processed and stored in the cooler 4 as described with respect to FIGS. 1-5. Carcasses are selected from storage based on a set of selection criteria and are then conveyed to the staging area to await fabrication (block 400). After leaving the staging area, the selected carcasses travel along exit rail 110 towards the fabrication area (block 410). Prior to reaching the fabrication area, the identification codes associated with the selected carcasses are read and the location of the selected carcasses in the database is updated as needed (block 420). Alternatively, the order of the selected carcasses exiting the cooler 4 is recorded such that no additional reading is required. Utilizing a set of sorting criteria that is different than (or is a subset of) the selection criteria, certain carcasses are routed onto to the sorting rail 350 while other carcasses remain on the exit rail 110 (block 440). Once sorted using the sorting criteria, some or all of the sorted carcasses, whether positioned on the sorting rail 350 or remaining on the exit rail 110, can be delivered for fabrication (block 460).

The carcasses can be selected and sorted using manual, semi-automated or fully automated systems. In one embodiment, carcasses are selected and sorted by receiving a set of selection or sorting criteria and querying the database for carcasses meeting the criteria. The criteria may be entered into the system via a workstation or similar peripheral input component. Alternatively, criteria can be automatically generated by systems/software that track customer orders, fabrication inventories or the like. Similarly, the storage and sorting rails can be configured to respond to processor requests for particular carcasses and/or sets of carcasses.

In one embodiment, the sorting method illustrated in FIG. 10 is used in conjunction with a carcass cooler selection method such that carcasses are initially selected in the cooler 4 based on a first set of criteria and then a secondary sort occurs as discussed above according to a second set of criteria. Carcass selection may be based on any of the criteria described herein. The subsequent sort may be based on a second set of criteria. The second set of criteria may be a subset (e.g., narrower range) of the first set of criteria, or alternatively, may involve a different set of criteria. By including this secondary sort, "on demand" product fabrication requirements may be more efficiently achieved. The example set forth below illustrates this embodiment in greater detail:

| Carcass | Predicted Shear Force Value (kg) |
|---|---|
| 1 | 14 |
| 2 | 14 |
| 3 | 15 |
| 4 | 15 |
| 5 | 15 |
| 6 | 16 |
| 7 | 16 |
| 8 | 16 |
| 9 | 16 |
| 10 | 16 |
| 11 | 17 |
| 12 | 17 |
| 13 | 18 |
| 14 | 19 |
| 15 | 20 |
| 16 | 21 |
| 17 | 22 |
| 18 | 23 |
| 19 | 23 |
| 20 | 27 |

The data set above shows predicted shear force values (a measure of meat tenderness) for 20 carcasses located on storage rails in a sales cooler. If a particular product requires a predicted shear force value greater than 18 kg, 13 of these carcasses would be selected as meeting the criteria and would be routed from the storage rail to the staging rail for fabrication. If a particular order only requires, for example, 10 carcasses meeting this criteria, the sorting rail is then used to separate the 10 carcasses with the best predicted shear force values from the 3 remaining carcasses. This can be achieved by routing either the 10 selected carcasses or the 3 non-selected carcasses onto the sorting rail. Alternatively, other factors such as sales orders, number of carcasses available in inventory, trimming specifications or other factors could be included in the criteria.

In this manner, greater efficiency and flexibility can be achieved to fulfill product requirements. Furthermore, embodiments of the present invention provide this sub-sorting feature outside of the cooler area 4, because cooler space is generally limited and costly.

Although the invention has been described with reference to preferred embodiments, persons skilled in the art will recognize that changes may be made in form and detail without departing from the spirit and scope of the invention.

We claim:

1. A system for conveying carcasses through a meat processing facility:
 a feed rail configured for conveying carcasses to a carcass cooler, the carcass cooler including:
  a storage area including at least one storage rail adapted to receive carcasses from the feed rail,
  a staging area including at least one staging rail adapted to receive carcasses from the storage area;
  an exit rail configured for conveying carcasses from the staging area to a carcass fabrication area; and
  a sorting rail associated with the exit rail, the sorting rail including an entrance path adapted to receive carcasses from the exit rail and an exit path adapted to return carcasses to the exit rail.

2. The system of claim 1 wherein the sorting rail is not positioned in the carcass cooler.

3. The system of claim 1 wherein the sorting rail includes at least one continuous loop.

4. The system of claim 3 wherein each continuous loop includes an entrance path and an exit path associated with the exit rail.

5. The system of claim 1 wherein the sorting rail includes a bypass rail.

6. The system of claim 1, further including means for selecting carcasses on the storage rail based on a first set of criterion.

7. The system of claim 6 wherein the selection means includes a reader for determining the identification codes of the carcasses in the vicinity of the sorting rail, a database for storing carcass information based on the identification codes and a processor for comparing the carcass information with the first set of criteria.

8. The system of claim 6 further including means for sorting selected carcasses based on a second set of criteria using the sorting rail.

9. A method for processing carcasses comprising:
 assigning unique identification codes to a plurality of carcasses coupled to rails configured to convey the carcasses from a first location to a second location;
 associating carcass information with the identification codes in a database;
 conveying the carcasses to a storage area having a storage rail;
 coupling the carcasses to the storage rail;
 selecting carcasses coupled to the storage rail for fabrication based on a first set of criteria;
 conveying the selected carcasses from the storage area to fabrication area on an exit rail;
 prior to fabricating the carcasses, sorting the selected carcasses on the exit rail based on a second set of criteria; and
 conveying the sorted carcasses to the fabrication area.

10. The method of claim 9, further including the step of determining the identification codes for the animals on the storage rail, exit rail or both.

11. The method of claim 9 wherein the selecting step includes the step of comparing the carcass information to the first set of criteria and selecting carcasses that meet the first set of criteria.

12. The method of claim 9 wherein the sorting step includes the step of comparing the carcass information to the second set of criteria and selecting carcasses that meet the second set of criteria.

13. The method of claim 9, wherein the sorting step includes conveying carcasses that meet the second set of criteria from the exit rail onto a sorting rail.

14. The method of claim 13 wherein the sorting step includes returning the carcasses from the sorting rail to the exit rail.

15. A system for processing carcasses comprising:
 means for identifying a plurality of carcasses in a processing facility;
 means for storing carcasses information based on the identifying means;
 a first rail for conveying carcasses to a carcass cooler
 a second rail associated with the first rail for storing carcasses in the carcass cooler;
 means for selecting stored carcasses based on a first set of carcass criteria;
 a third rail associated with the second rail for conveying selected carcasses to a fabrication area;
 means for sorting the selected carcasses prior to fabrication based on a second set of criteria.

16. The system of claim 15 wherein in the identifying means includes at least identifications tags associated with the carcasses and at least one reader adapted to read the identifications tags.

17. The system of claim 15 wherein the storing means includes a computer database.

18. The system of claim 15 wherein the selecting means, sorting means or both includes a processor adapted to compare carcass criteria with the carcass information.

* * * * *